United States Patent
Den Hartog

(10) Patent No.: US 9,584,552 B2
(45) Date of Patent: Feb. 28, 2017

(54) METHOD AND MOBILE USER EQUIPMENT FOR HANDLING MEDIA TYPES OF A COMMUNICATION SESSION IN AN IMS COMMUNICATION SYSTEM AND AN IMS NODE

(75) Inventor: Jos Den Hartog, Capelle a/d Ijsel (NL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1077 days.

(21) Appl. No.: 13/132,276

(22) PCT Filed: Dec. 1, 2008

(86) PCT No.: PCT/EP2008/010179
§ 371 (c)(1),
(2), (4) Date: Jun. 1, 2011

(87) PCT Pub. No.: WO2010/063295
PCT Pub. Date: Jun. 10, 2010

(65) Prior Publication Data
US 2011/0238846 A1    Sep. 29, 2011

(51) Int. Cl.
*G06F 15/16* (2006.01)
*H04L 29/06* (2006.01)
*H04L 67/141* (2013.01);
H04W 4/00 (2013.01);
*H04W 76/02* (2013.01)
(Continued)

(52) U.S. Cl.
CPC ...... *H04L 65/1016* (2013.01); *H04L 65/1093* (2013.01); *H04L 67/14* (2013.01);
(Continued)

(58) Field of Classification Search
CPC ... H04L 67/14; H04L 67/141; H04L 65/1016; H04L 65/1093; H04W 4/00; H04W 76/02
See application file for complete search history.

(56) References Cited

U.S. PATENT DOCUMENTS

| 7,483,989 B2 * | 1/2009 | Williams ............ H04L 29/06 |
| | | 709/227 |
| 2004/0048612 A1 | 3/2004 | Virtanen et al. |

(Continued)

OTHER PUBLICATIONS

Ron Shacham et al: "Ubiquitous Device 1-20 Personalization and Use: The Next Generation of IP Multimedia Communications" ACM Transactions on Multimedia Computing Communications and Applications, Association for Computing Machinery, US, vol. 3, No. 2, May 1, 2007 (May 1, 2007) XPOO7907295.

(Continued)

*Primary Examiner* — Dhairya A Patel

(57) ABSTRACT

A method of and mobile User Equipment, UE, for handling media types of an Internet Protocol, IP, multimedia communication session in an IP Multimedia communication Subsystem, IMS, wherein at the receipt of a session set up request message a mobile UE presents media type handling options based on the session set up request message. After receiving media type handling instructions by the mobile UE, based on the presented media type handling options, a session accept message is transmitted by the mobile UE in accordance with the media type handling instructions. Based on the media type handling instructions, media type may be routed by the IMS to terminal equipment remote from the mobile UE.

21 Claims, 4 Drawing Sheets

(51) Int. Cl.
*H04L 29/08* (2006.01)
*H04W 4/00* (2009.01)
*H04W 76/02* (2009.01)

(56) References Cited

U.S. PATENT DOCUMENTS

| | | | | |
|---|---|---|---|---|
| 2005/0060411 | A1* | 3/2005 | Coulombe | H04L 29/06 709/227 |
| 2006/0095590 | A1* | 5/2006 | Miller | H04L 69/04 709/246 |
| 2007/0058637 | A1* | 3/2007 | Lo | H04L 29/06027 370/395.2 |
| 2007/0130345 | A1* | 6/2007 | Da Palma | H04L 69/40 709/227 |
| 2007/0140299 | A1* | 6/2007 | Hofmann | H04L 29/06 370/486 |
| 2007/0156909 | A1* | 7/2007 | Osborn | H04L 67/16 709/227 |
| 2008/0004052 | A1 | 1/2008 | Blowbaum et al. | |
| 2008/0089307 | A1 | 4/2008 | Tuijn et al. | |

OTHER PUBLICATIONS

Teodora Guenkova-Luy et al: "Service Mobility with SIP, SDP and MPEG-21" Telecommunications, 2007. Contel .2007 9<sup>th</sup> International Conference on, IEEE, PI, Jun. 1, 2007 (Jun. 1, 2007), XP031113737 ISBN: 978-953-184-110-8.

3GPP: "3rd Generation Partnership Project; Technical Specification Group Services and Architecture; Feasibility Study on Multimedia Session Continuity; Stage 2(Release 8)" 3GPP Draft; 23893-200, 3rd Generation Partnership Project (3GPP), Mobile Competence Centre ; 650, Route Des Lucioles ; F-06921 Sophia-Antipolis Cedex; France, vol. TSG SA, no. Prague, Czech Republic; Jun. 2, 2008, Jun. 2, 2008 (Jun. 2, 2008), XP0S0211170 [retrieved on Jun. 2, 2008].

Rosenberg, et al: "SIP: Session Initiation Protocol". Network Working Group. Request for Comments: 3261. Jun. 2002.

Johnston, et al: "Session Initiation Protocol (SIP) Basic Call Flow Examples". Network Working Group. Request for Comments: 3665. Dec. 2003.

Handley, et al: "SDP: Session Description Protocol". Network Working Group. Request for Comments: 4566. Jul. 2006.

\* cited by examiner

METHOD AND MOBILE USER EQUIPMENT FOR HANDLING MEDIA TYPES OF A COMMUNICATION SESSION IN AN IMS COMMUNICATION SYSTEM AND AN IMS NODE

TECHNICAL FIELD

The present invention relates to call handling in mobile communications and, more particularly, to the handling of media types of a communication session in an Internet Protocol (IP) Multimedia Subsystem (IMS), for supporting multi media communication with mobile User Equipment, UE, as well as to an IMS node for supporting the handling of media types.

BACKGROUND

IMS is a communications platform for supporting rich multimedia communications with a mobile UE operating in a radio access network, such as GSM (Global System for Mobile communications), GPRS (General Packet Radio Service), or UMTS (Universal Mobile Telecommunications System), for the handling of media types such as video, including streaming video, images, audio, voice and data sharing. IMS applies applications that are based on SIP (Session Initiation Protocol) signalling enabling multimedia sessions.

In private (home, office) and public (on the street, public offices, shops) environments, terminal equipment, such as (large) displays or screens are available, connected to an IP communication infrastructure, such as a wired or high speed wireless data network, which terminal equipment can be (temporary) seized by the mobile UE to handle media types of a multimedia communication session of an IMS client of the mobile UE as to display video content of such a communication session, for example. Other media types, such as audio, may also be directed or routed to suitable terminal equipment, such as loudspeakers belonging to a display or screen, for example.

When an IMS client is registered on a mobile UE, such as a mobile telephone, arriving media, such as video, is presented on the display of the telephone. For some communications or applications the display of the mobile user equipment is too small.

Prior art suggests to receive, using GSM or UMTS, for example, the video content at the mobile user equipment, and to redirect this video content, using a short range wireless communication technology, such as Bluetooth or Wireless Local Area Network (WLAN), from the mobile UE to a nearby display or remote terminal equipment suited for completely viewing the video content, for example.

This may involve that the video content is processed by the mobile UE without actually being viewed at the mobile UE, while demanding a relatively high processing power of the processor of the mobile UE and consuming scarce battery power of the mobile UE.

The short range wireless communication technology, from its limited range and transmission capacity, poses limitations on the geographic distance between the mobile UE and the nearby display or remote terminal equipment, as well as on the quality of the video content to be displayed.

SUMMARY

It is an object of the present invention to provide an efficient method of handling media types of an IMS communication session in mobile UE, as well as a mobile UE and an IMS node equipped for supporting such method.

In a first aspect, the present invention provides a method of handling media types of an IP multimedia communication session in an IMS communication system, by a mobile UE comprising an IMS client supporting SIP signalling, the method comprising the steps of:

receiving a SIP session set up request message by the mobile UE, processing the received SIP session set up request message by the IMS client, initiating, by the IMS client, a presentation of media type handling options by the mobile UE based on the SIP session set up request message, receiving media type handling instructions by the mobile UE based on the presented media type handling options, and initiating, by the IMS client, a transmission of a SIP session accept message by the mobile UE in accordance with the received media type handling instructions.

In accordance with the invention, when an IMS client on a mobile UE processes a request for setting up a multimedia communication session with a calling user or calling party, media type handling options or possibilities are presented, for example displayed, by the receiving mobile UE to the user thereof, i.e. the called party.

Examples of such media type handling options in a multimedia communication call comprising video and audio media type content are, for example:

1. Accept audio content, reject video content.
2. Accept audio and video content, use display of the mobile UE although no optimal fit.
3. Accept audio and video content, use nearby screen to display the video content.
4. Accept audio and video content, use display of the mobile UE and use also nearby screen to display the video content.

Based on these options, for example, the called user can decide that the audio content is to be terminated at the mobile UE (as usual) and that the video content is to be terminated at terminal equipment remote from the mobile UE, such as a nearby (public) display or screen, i.e. option 3. The IMS client on the mobile UE processes the selected option, for example inputted by the called user at a keypad of the mobile UE, as media type handling instructions, and initiates in response to the SIP session set up request message, transmission of a SIP session accept message reflecting the received media type handling instructions.

In the IMS communication system, i.e. a calling UE receiving the SIP session accept message from the called mobile UE in a first multimedia communication session with the called mobile UE, a second or even third or further multimedia communication session may be set up via the IMS with remote terminal equipment for handling the media type content of the first multimedia communication session in accordance with the media type handling instructions forwarded by the mobile UE of the called user.

In accordance with options 3 and 4 above, video content belonging to the first communication session is directed or routed by the IMS communication system to the nearby screen in a second multimedia communication session with the screen. The second, third or further communication sessions may be set up using standardised SIP signalling.

Different from the prior art disclosed above, the media type content to be displayed and/or audibly presented by the remote terminal equipment is directly forwarded from the IMS communication system, thereby not occupying additional processing and battery power of and communication resources to the called mobile UE. The remote terminal equipment may communicate with the IMS communication system by wired or high speed wireless data connections, like the Internet, such that data transmission capacity should not be a problem. In particular not in the case of streaming media types, for example streaming video, wherein an even richer content display or presentation may be provided.

It will be appreciated that other or more options for handling media types may be displayed by the mobile UE, or otherwise presented, for example in audible form, for handling media types by other remote terminal equipment in addition to or as an alternative for a display or screen or loudspeaker on the mobile UE, such as a (public) display or screen or (stereo) loudspeaker(s) or even to another mobile UE, having a screen that is better adapted for viewing the video content, for example.

Identification data of remote terminal equipment may comprise a URL or an IP-address of the terminal equipment, for example, as is well known in practice. In an example of the invention, the IMS client on the mobile UE may process identification data of remote terminal equipment available to the mobile UE by inputting these data, by the called user, on input means of the mobile UE, such as a keypad, touch screen, or the like. The identification data may be visually indicated on a display or screen to be used, for example.

In another example of the invention, identification data of remote terminal equipment may be received by the mobile UE and processed by its IMS client, in the course of the communication session, from identification data stored in a database, such as a database available in or to the IMS communication network, or from a database directly available to the mobile UE, or identification data directly received by the mobile UE from remote terminal equipment available to the mobile UE, using any communication technology available to the mobile UE. The expression 'remote terminal equipment available to the mobile UE' should be construed in that the user of the mobile UE may have access to the remote terminal equipment, for viewing or listening purposes or otherwise.

In the case of a remote database available to the IMS communication system, in another example of the invention, identification data of remote terminal equipment may be processed by the IMS client on the mobile UE received in an extended SIP session set up request message. To this end, the SIP set up request may be extended using the standardised Session Description Protocol (SDP), which is used to negotiate the media type (e.g. voice, video) that is going to be used during a (SIP) session.

In a further example of the invention, identification data of remote terminal equipment are processed by the IMS client on the mobile UE based on a momentary geographic location of the mobile UE. That is, only identification data are presented, e.g. displayed, by the mobile UE, of remote terminal equipment which might be available to the mobile UE.

In the case of identification data of remote terminal equipment provided from a database, the momentary geographic location of the mobile UE is established using, for example, known techniques such as GSM location, GPS, local radio beacons, or others. By storing the identification data of terminal equipment in the database in relation to their geographic location, the mobile UE may only receive identification data of available remote terminal equipment, which makes the selection of suitable remote terminal equipment convenient to the user of mobile UE while avoiding exchange of excess information. Location data may be determined by the IMS communication system and/or the mobile UE itself, or even inputted by the called user from a displayed map or other characteristics, signs, and the like.

In a yet other example of the invention, identification data of remote terminal equipment may be processed by the IMS client from data received at the mobile UE and autonomously transmitted, for example broadcasted, by the remote terminal equipment or upon request of the mobile UE. Such identification data may be exchanged using any of a wireless short range communication technology, such as Bluetooth, WLAN, optical (IR) transmission and the like. The mobile UE has to be, of course, equipped for such communications.

In the event of a plurality of remote terminal equipment available to the mobile UE, the selection of suitable terminal equipment is under the control of the called mobile UE, i.e. the called user. The media type handling options presented by the mobile UE may reflect available terminal equipment directly or in a second step, for example, when the user of the mobile UE first has indicated what media type should be directed to remote terminal equipment, for example. The skilled person will appreciate that a variety of media type handling options may be presented and in a variety of ways, which are construed to be encompassed by the present disclosure. In the event that just one alternative remote terminal equipment is available to a mobile UE, it will be appreciated that the identification data of such terminal equipment may be directly included in the media type handling options presented.

A typical characteristic of mobile UE is that, in an ongoing multimedia communication session, same may be moving. In accordance with an example of the invention, the IMS client processes updated identification data of remote terminal equipment available to the mobile UE. The updated identification data may be received at the mobile UE directly, or via the IMS system, or inputted by the called user, as elucidated above. Updated identification data may be processed by the IMS client in a SIP INFORMATION or UPDATE message, for example, populated with suitable SDP information.

It will be appreciated that 'handover' of media type to other terminal equipment, like the complete session, should be under control of the called user. That is, the user must be able to stop the second, third or even further sessions with remote terminal equipment and must decide about the routing of media types to other, i.e. updated, terminal equipment. To this end, the updated identification data are presented by the mobile UE to the called user. After a suitable selection of the called user, for example new identification data inputted by the called user at a keypad of the mobile UE as updated media type handling instructions, the updated identification data for receiving the at least one media type of the multimedia are processed by the IMS client of the called UE and forwarded to the IMS system for setting up a session with another remote terminal based on the updated handling instructions received at the mobile UE. In accordance with the invention this can be done using suitable SIP signalling commands, such as UPDATE, for setting up a new session and terminating an existing session.

It is noted that updating identification data of remote terminal equipment may not only occur for moving mobile UE, but also for moving remote terminal equipment, for example a mobile screen mounted on a car. Not only the availability to the mobile UE should be updated but also the location data of such moving terminal equipment in a database maintaining identification data of terminal equipment in relation to the geographic location thereof. Such a database update may occur, in accordance with the invention, under control of and from the mobile UE.

The invention also provides mobile UE, comprising processing means connected to input means, output means and communication means, the mobile UE is arranged for supporting calls in a radio access network and communication sessions in an IMS communication system, wherein the processing means are arranged for executing an IMS client supporting SIP signalling for handling media types of a multimedia communication session, the IMS client is arranged for processing a SIP session set up request message received via the communication means. The IMS client is further arranged for:

initiating a presentation of media type handling options via the output means, based on the SIP session set up request message processed by the IMS client,
  processing media type handling instructions received via the input means, based on the media type handling options, and
  initiating a transmission of a SIP session accept message via the communication means by the IMS client in accordance with the media type handling instructions.

In a further example of the mobile UE according to the invention, the IMS client executed by the processing means is further arranged for processing identification data of remote terminal equipment and extending the SIP session accept message with identification data of remote terminal equipment for receiving at least one media type of the multimedia communication session.

The identification data being received via at least one of:
  input data provided via the input means of the mobile UE,
  identification data stored in a database, received via the communication means,
  identification data received by the mobile UE from remote terminal equipment via communication means available to the mobile UE.

In another example of the invention, the mobile UE is arranged for supporting communications in a short-range wireless transmission technology for receiving identification data autonomously transmitted by the remote terminal equipment or upon request of the mobile UE.

In a further aspect the invention provides an IMS node comprising processing means connected to communication means, the IMS node is arranged for supporting multimedia communication sessions with mobile UE in a radio access network and SIP signalling for handling media types in a first multimedia communication session in an IMS communication system, wherein the processing means of the IMS node are arranged for initiating an establishment of a second multimedia communication session with remote terminal equipment identified by identification data received via the communication means in the first communication session, and arranged for initiating a forwarding, via the communication means, of at least one media type of the first multimedia communication session to the remote terminal equipment. The processing means of the IMS node are arranged for initiating a forwarding via the communication means of the at least one media type to the remote terminal equipment based on handling instructions received via the communication means of the IMS node from the mobile UE.

In a further example, in accordance with the invention, the processing means of the IMS node are arranged for initiating a transmission, via the communication means of the IMS node, to the mobile UE, of identification data of remote terminal equipment available to the mobile UE.

To this end, in another example of the invention, the processing means of the IMS node may be arranged for initiating an establishment of a momentary geographic location of the mobile UE, and for initiating a transmission via the communication means of the identification data to the mobile UE based on the geographic location of the mobile UE. The processing means of the IMS node may be arranged for accessing, via the communication means, a database in or available to the IMS communication system, comprising identification data of remote terminal equipment. The processing means of the IMS node may be further arranged for updating the database by remote terminal equipment identification data received via the communication means of the IMS node from the mobile UE.

The above-mentioned and other features and advantages of the invention will be best understood from the following description, with respect to the enclosed drawings. In the drawings, like reference numerals denote identical parts or parts performing an identical or comparable function or operation.

DETAILED DESCRIPTION OF EXAMPLE EMBODIMENTS

The present invention will be illustrated by way of example and not by way of limitation in a Radio Access Network (RAN), such as a GSM, GPRS or UMTS mobile radio communication network, wherein a call and a session in an IMS multimedia communication system are established for supporting the handling of multimedia content to user equipment supported by the RAN and IMS.

Figure 1:
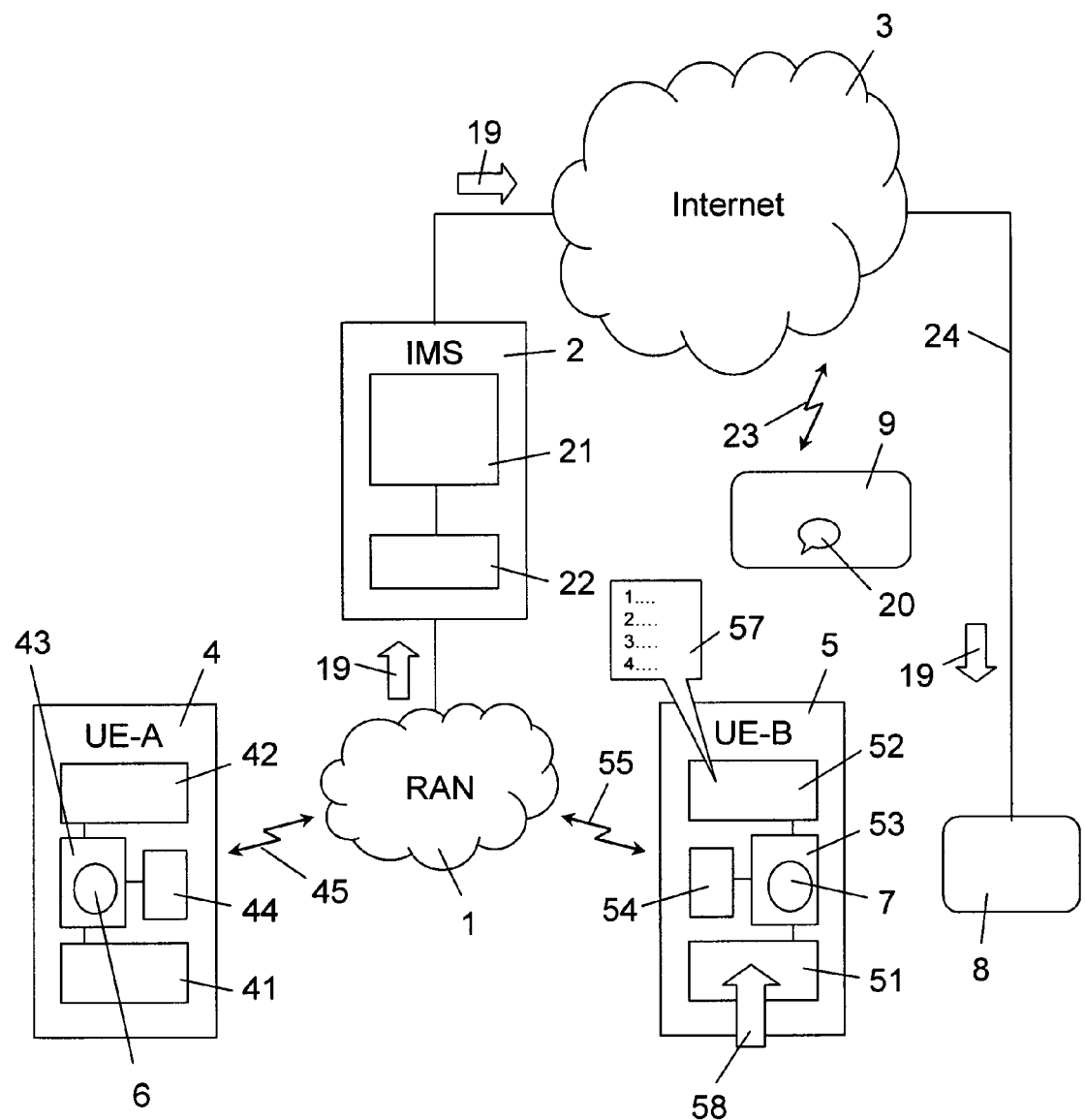
FIG. 1 is a schematic view of part of a communications environment for illustrating an example of the present invention.

In FIG. 1, reference numeral 1 indicates an RAN, and reference numeral 2 indicates an IMS communication platform comprising or constituted by an IMS node to support multimedia communication in the RAN 1. The IMS platform 2 comprises processing means 21 which connect to communication means 22 connecting to the public Internet 3 and/or any other data network supporting Internet Protocol (IP) data exchange.

Reference numerals 4; 5 denote mobile UE, such as a mobile telephone or any other mobile communication device equipped for radio communication 45; 55 with the RAN 1. The mobile UE 4; 5 each comprise an input unit or input means 41; 51, such as a key pad, a touch screen and the like, an output unit or output means 42; 52, such as a display, and communication means 44; 54 comprising transceiver means for wireless communication with the RAN 1, each connecting to processing means 43; 53 such as a microprocessor. The processing means 43; 53 execute an IMS client 6; 7, respectively, for supporting SIP signalling and multimedia communication with the IMS platform 2.

Reference numerals 8, 9 denote remote terminal equipment connected to the Internet 3, by respectively a wired 24 or wireless 23 transmission link, such as (public) screens or displays, audio equipment such as (stereo) loudspeakers, etc. The terminal equipment 8, 9 is arranged for exchange of multimedia content or, in short, media types, via IP-protocol data transfer with the Internet 3 and the IMS platform 2.

Figure 2:
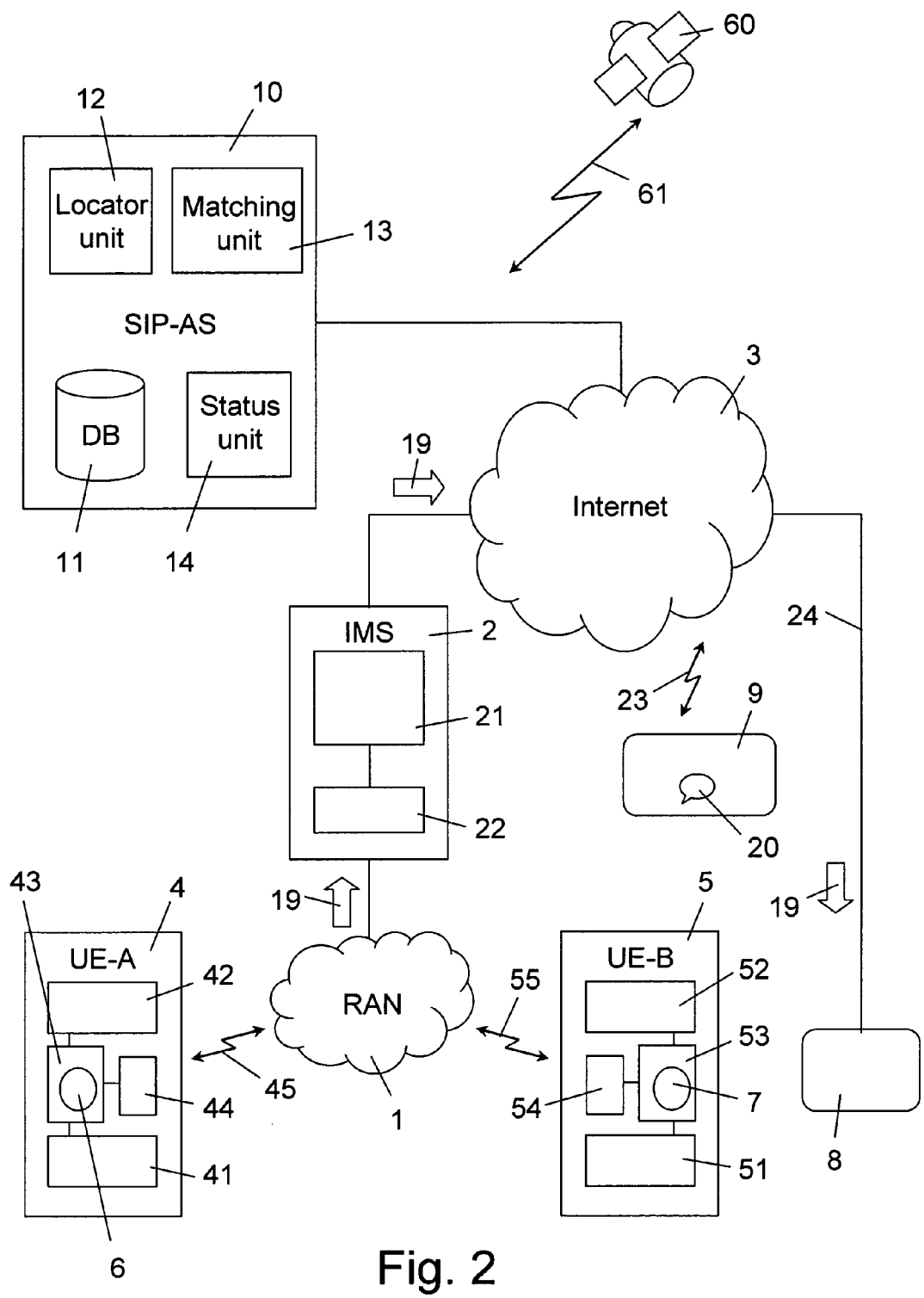
FIG. 2 is a schematic view of part of a communications environment for illustrating another example of the present invention.

For the sake of simplicity, just two UE 4, 5 have been shown in FIG. 2, connected by a radio link 45; 55 to the RAN 1. In practice, a plurality of UE 4, 5 connects to the RAN 1 and a plurality of terminal equipment 8, 9 may connect to the Internet 3. Each UE 4, 5 and terminal equipment 8, 9 comprises identification data 20, such as a URL or an IP-address.

It is assumed that UE 4, also called the calling party, A-Party or UE-A, would like to send a multimedia type, such as video, to mobile UE 5, also called the called party, B-party or UE-B, via the respective communication means 44; 54 and RAN 1, supported by the IMS platform 2. Although in this example the calling UE 4 is depicted as a mobile entity, connected to the RAN 1, UE 4 can also be a wired entity, such as a wired Voice over IP (VoIP) telephone or a Plain Old Telephone System (POTS) telephone, or any other suitable communication device equipped for SIP signalling.

Figure 4:
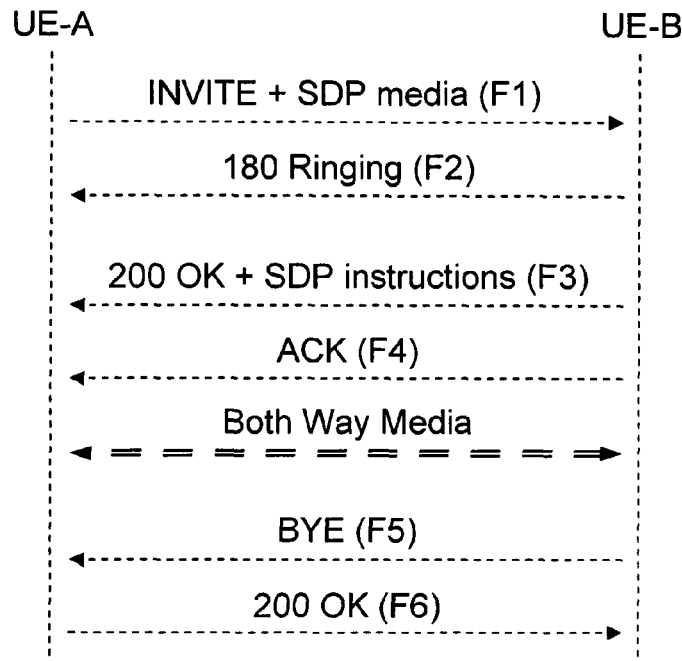
FIG. 4 schematically shows a typical prior art signalling scenario for session establishment in an IMS communications system.

As schematically indicated in FIG. 4, for the exchange of the multimedia content, a communication session supported by the IMS platform 2 has to be established. In a first step, using SIP signalling, UE-A sends a session set-up request message, SIP INVITE, initiated by the IMS client 6, inviting UE-B for setting up a session. This session set-up request message is populated with SDP parameters, to describe the media type or types to be communicated, i.e. indicated as INVITE+SDP media (F1). The SIP-INVITE comprises a request Universal Resource Indicator (URI) being an indication of the delivery address for the multimedia content. The SDP parameters, among others, may further comprise connection information, including identification data of the IMS client 6 of a UE 4, generally the IP-address of the IMS client of the UE, and others such as capabilities of UE 4. Receipt of the session set-up request message (F1) is acknowledged by UE-B, i.e. the IMS client 7, by forwarding SIP message 180 Ringing (F2).

To accept the session request, the IMS client 7 of UE-B initiates a transmission of a SIP session accept message, SIP 200 OK, by which UE-B also indicates how multimedia content can be forwarded by UE-A to UE-B. Generally, the URI address of UE-B will be indicated as the address for delivering the multimedia content.

After transmission of an acknowledgement message (F4) SIP ACK from the IMS client 6 of UE-A via the IMS platform 2 to the IMS client 7 of UE-B, a communication session is established supported by the IMS platform 2 for communication of one or several media types between UE-A and UE-B, i.e. indicated in FIG. 4 as 'Both Way Media'.

To end an IMS session, for example by UE-B, a SIP BYE message (F5) is initiated by IMS client 7 and forwarded via the communication means 54 of UE-B, indicating that the session can be terminated. Receipt of this SIP BYE message is acknowledged by UE-A by sending a message SIP 200 OK (F6) initiated by the IMS client 6. This terminates the exchange of multimedia content between UE-A and UE-B.

In accordance with an example of the present invention, in the signalling scenario shown in FIG. 4, at receipt of the SIP session set-up request message F1, UE-B i.e. the output means 52 of the called mobile UE 5, present media type handling options 57 (FIG. 1), based on the SDP media parameters included in the session set-up request message F1.

Suppose that the session set-up request message F1 indicates that UE-A would like to send video content to UE-B. Than, the IMS client 7 of the mobile UE 5 initiates a presentation at the output means 52 of the mobile UE 5 of one or several media type handling options 57 for handling the video content by the called user of the mobile UE 5 (i.e. UE-B).

An example of such media type handling options is:
1. Accept audio content, reject video content.
2. Accept audio and video content, use display of mobile UE although no optimal fit.
3. Accept audio and video content, use nearby (public) screen X to display the video content.
4. Accept audio and video content, use display of mobile UE and use also nearby (public) screen X to display the video content.

In this example, it is assumed that the media type handling options 57 are displayed at the display means 52 of the mobile UE 5, which will be the most common manner in practise. However, it is also possible to audibly present the call handling options, for example. A screen X for displaying the video content is, for example, remote terminal equipment 8, 9 in FIG. 1.

The called user or B-party now has to select a respective presented call handling option, which selection is received as a media type handling instruction by the mobile UE 5, i.e. UE-B, for example by inputting the selected option via a User Interface (UI), i.e. via the input means 51, available at the mobile UE 5, such as a keypad, touch screen, voice recognition unit, and the like. Schematically indicated by arrow 58.

The media type handling instructions 58 received by the mobile UE 5 are transferred by the processing means 53, i.e. the IMS client 7, into suitable SDP parameters by which the session accept message SIP 200 OK is extended and transmitted from UE-B 5, shown as SIP 200 OK+SDP instructions (F3). This session accept message F3, for example, may indicate that the audio type content is to be terminated at the output means 52 of mobile UE 5 while the video type content is to be terminated at a nearby screen or display, i.e. remote terminal equipment 8, 9 other than the display of mobile UE 5, i.e. option 3 above. Receipt of the session accept message F3 by the IMS client 6 of UE-A 4 will result therein that, initiated by the IMS client 6, a further or second communication session is set up, in the IMS platform or node 2, i.e. the processing means 21 thereof, with remote terminal equipment 8, 9 for delivering the video content. This schematically indicated by arrow 19.

If the called user knows the identification data 20, such as a Uniform resource Locator (URL) of the remote terminal equipment to which the video content is to be directed, for example http://screen9.public.com:5678, he or she may input these identification data 20 via the input means 51 into the mobile UE 5 directly at the selection of a particular call handling option 57. The thus provided identification data will be put into the session accept message F3, and will be used in the processing means 21 of the IMS 2 for setting up the required session(s) and routing 19 of the video content to the respective remote terminal equipment 8, 9. The URL address of the remote terminal equipment 8, 9 may be known, for example, because it is visually displayed at or on the screen thereof.

Figure 5:
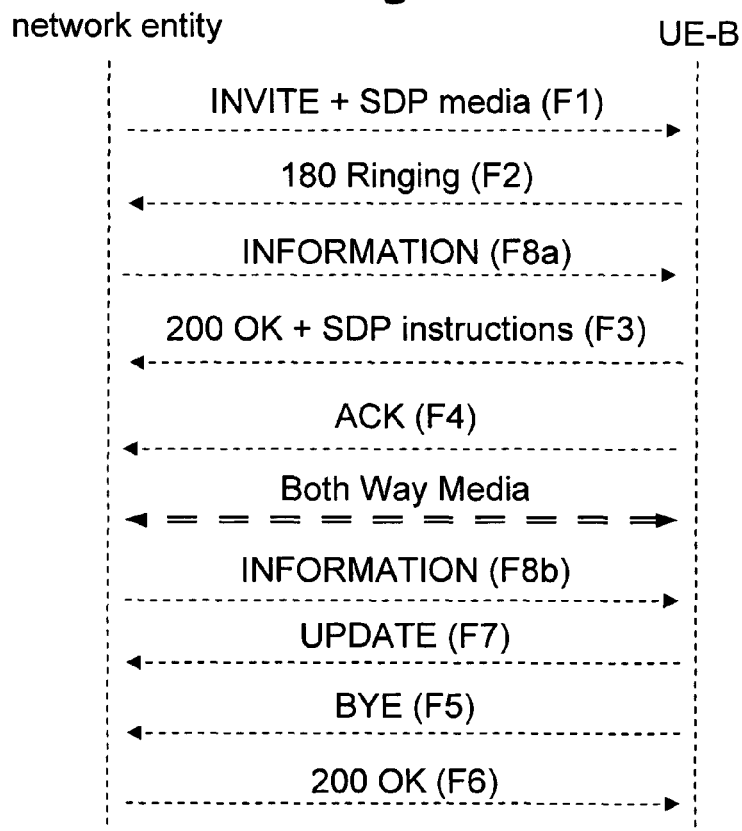
FIG. 5 schematically shows a signalling scenario in accordance with an example of the present invention.

The called user, i.e. UE-B, keeps control over the session or sessions, to stop the display at the remote terminal 8, 9, for example, which can be provided by the standard SIP message UPDATE (F7), as indicated in FIG. 5.

If the identification data 20 of the remote terminal equipment 8, 9 is not known to the called user, same may be provided to the called UE-B with the session setup message F1 or in a separate SIP INFORMATION (F8a), (F8b) message, for example, shown in FIG. 5. The session setup message F1 is initialized towards UE-B 5 by a network entity such as the UE-A 4, an IMS node within the IMS platform 2 or a network service executed at the SIP-AS 10. The identification data may be retrieved from a database, DB, in or available to the IMS platform 2, such as database 11 shown in FIG. 2.

In FIG. 2, a SIP-Application Server (SIP-AS) 10 is shown, connected to the Internet 3, and arranged for providing service to IMS platform or node 2. In this example, database 11 is arranged in SIP-AS 10. Note that the database may also reside in the UE 4, 5 or may be directly available to a UE, for example via the RAN 1 or another communication technology available to the UE, such as WLAN, Bluetooth, IR, or the like. Further, the SIP-AS 10 and the IMS platform or node 2 may be combined.

To avoid providing identification data 20 of remote terminal equipment 8, 9 not relevant to the called mobile UE 5, because the called user has no line of sight to a (public) screen or cannot hear a remote audio device, SIP-AS 10 is provided with a locator unit 12 for determining the geographic location of the called user, i.e. mobile UE 5. Any suitable geographic location determination means may be used, such as GPS position signals 61 from a GPS satellite system 60, or other positioning system, GSM location, wireless communication beacons or the like. The location may also be determined from input provided by a user via the mobile UE 5, for example from a map displayed at the mobile UE or from a positioning unit in the mobile UE.

In the database 11, identification data 20 are arranged dependent on geographic location information of the corresponding remote terminal equipment 8, 9. Only those identification data 20 are provided which are available to the called mobile UE 5 based on the determined location information and provided that the remote terminal equipment 8, 9 is not seized by another session. To this end, status unit 14 in SIP-AS 10 is provided, which keeps track of terminal equipment encountered in an ongoing session. Further, terminal equipment to which the mobile UE may have no access to, from technical perspective, for example, or which do not meet the received call handling instructions, may also be excluded. To this end, a matching unit 13 is provided in the SIP-AS 10.

Figure 3:
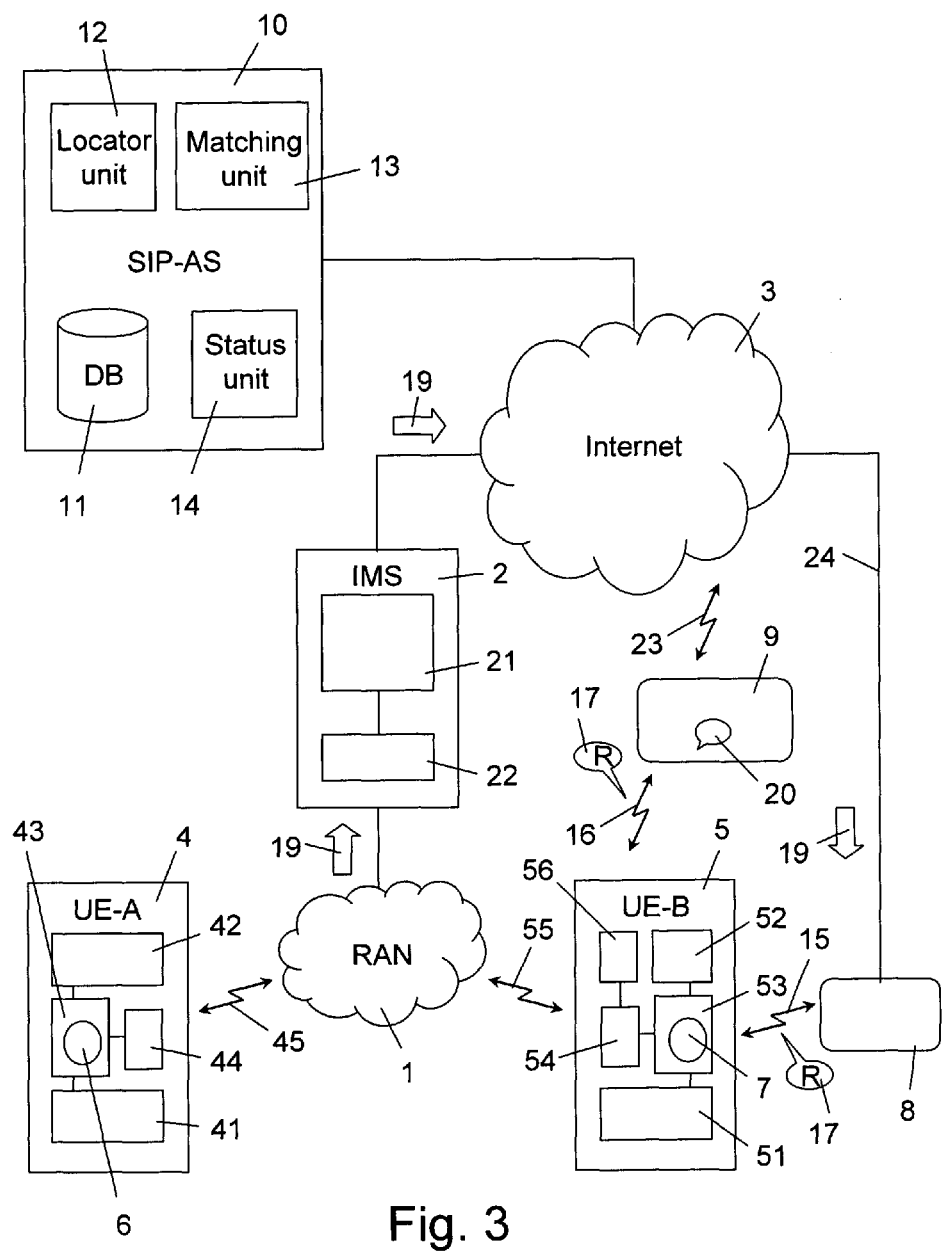
FIG. 3 is a schematic view of part of a communications environment for illustrating further examples of the present invention.

As illustrated in FIG. 3, identification data of remote terminal equipment 8, 9 may also directly received at the mobile UE, such as mobile UE 5, from the remote terminal equipment 8, 9 via any of an available short range (a few meters and up) wireless communication technology, like WLAN, Bluetooth, IR, etc. The remote terminal equipment 8, 9 may be arranged for autonomously transmission of their identification data 20, such as their URL, and other information via a short range communication link 15, 16 in broadcast form, for example, and received by the radio communication means of the mobile UE 5, such as a special short range radio communication unit or means 56 of the mobile UE 5. However, identification data 20 may also be provided upon request of the mobile UE 5, as indicated by a request (R) message box 17.

The thus received identification data may be exchanged with the SIP-AS 10, via the UE 4, using SIP signalling, to update the database 11, for example. To this end, the SIP UPDATE message (F7) shown in FIG. 5 may be used, populated with the the appropriate SDP parameters.

SIP UPDATE (F7) and SIP INFORMATION (F8a), (F8b) can also be used for updating the database 11 and informing the called mobile UE 5 and/or the calling UE 4 when remote terminal equipment is moving out of the availability of mobile UE 5, such as the mobile remote terminal equipment 9, or the other way around if the mobile UE 5 moves out of the reach of terminal equipment 8, 9 for example, by which content is handled in connection with an ongoing session. This to provide for "handover" of content from terminal equipment. However, the decision to seize or occupy terminal equipment remains with the called user UE-B, who keeps control over the session with respect to the delivery or routing of media type content.

IMS platform 2 and SIP-AS 10 may reside in one or several IMS supporting nodes or servers, such as termed S-CSCF, I-CSCF, P-CSCF (Call Session Control Function) or an IMS gateway or other server.

The present invention is not limited to the embodiments as disclosed above, and can be modified and enhanced by those skilled in the art beyond the scope of the present invention as disclosed in the appended claims without having to apply inventive skills.

The invention claimed is:

1. A method of handling media types of an Internet Protocol, IP, multimedia communication session in an IP Multimedia communication Subsystem, IMS, by calling User Equipment, UE, and called mobile UE comprising an IMS client supporting Session Initiation Protocol, SIP, signalling, said IMS comprising an IMS node having processing means connected to communication means for supporting a multimedia communications session in said IMS, and at least one remote terminal equipment arranged for exchanging multimedia content via said IMS, said method comprising steps of:

receiving a SIP session set up request message, from said calling UE, by said called mobile UE for establishing a first multimedia communication session in said IMS with said calling UE supported by said IMS node, and processing said received SIP session set up request message by said IMS client of said called mobile UE, initiating, by said IMS client of said called mobile UE a presentation of media type handling options by said called mobile UE based on said processed SIP session set up request message, receiving media type handling instructions by said called mobile UE based on said presented media type handling options, initiating, by said IMS client of said called mobile UE, in response to said processed SIP session set up request message, a transmission of a SIP session accept message to said calling UE in accordance with said received media type handling instructions, initiating, by said IMS client of said calling UE a second multimedia communication session with one of the at least one remote terminal equipment supported by said IMS node based on said SIP session accept message, and forwarding, in said second multimedia communication session, by said IMS node to said one of the at least one remote terminal equipment at least one media type of said first multimedia communication session, wherein the one of the at least one remote terminal equipment plays at least one of audio and video of the at least one media type of the first multimedia communication session.

2. The method according to claim 1, wherein said SIP session accept message is extended by said IMS client of said called UE with identification data of the one of the at least one remote terminal equipment for receiving at least one media type of said first multimedia communication session.

3. The method according to claim 2, wherein said IMS client of said called UE processes identification data of said at least one remote terminal equipment available to said called mobile UE.

4. The method according to claim 3, wherein said identification data are received by said called mobile UE from at least one of:
   input data provided at user input means of said called mobile UE,
   identification data stored in a database,
   identification data received by said called mobile UE from at least one of said at least one remote terminal equipment.

5. The method according to claim 4, wherein said database is a remote database and said identification data are received by said called mobile UE from said database in an extended SIP session set up request message.

6. The method according to claim 4, wherein said identification data are received by said called mobile UE based on a momentary geographic location of said called mobile UE.

7. The method according to claim 4, wherein said identification data are received by said called mobile UE from an autonomous transmission, by at least one of said at least one remote terminal equipment or upon request of said called mobile UE.

8. The method according to claim 3, wherein said IMS client of said called mobile UE, in an ongoing multimedia communication session, processes updated identification data of said at least one remote terminal equipment available to said called mobile UE.

9. The method according to claim 8, wherein said updated identification data are received by said called mobile UE while said called mobile UE is moving.

10. The method according to claim 8, wherein said updated identification data are processed by said called mobile UE in a SIP INFORMATION, or UPDATE message.

11. The method according to claim 8, wherein said updated identification data are displayed by said called mobile UE, and wherein said IMS client of said called mobile UE initiates a transmission of said updated identification data for receiving said at least one media type of said multimedia based on handling instructions received at said called mobile UE.

12. A Mobile User Equipment, UE, comprising a microprocessor connected to an input unit, an output unit, and a transceiver, said mobile UE is arranged for supporting calls in a radio access network and communication sessions in an Internet Protocol, IP, Multimedia communication Subsystem, IMS, wherein the microprocessor is arranged for executing an IMS client supporting Session Initiation Protocol, SIP, signalling for handling media types of a multimedia communication session, said IMS client is arranged for processing a SIP session set up request message received from a calling User Equipment, UE, via said transceiver, to establish a first multimedia communications session in said IMS with said calling UE supported by said IMS node, wherein said IMS client is further arranged for:

initiating a presentation of media type handling options via said output unit, based on said SIP session set up request message processed by said IMS client, processing media type handling instructions received via said inputs unit, based on said media type handling options, and initiating a transmission of a SIP session accept message to said calling UE via said transceiver by said IMS client in response to said processed SIP session set up request message in accordance with said media type handling instructions, for exchanging at least one media type of said first multimedia communication session with one of at least one remote terminal equipment supported by said IMS node based on said SIP session accept message, wherein the one of the at least one remote terminal equipment plays at least one of audio and video of the at least one media type of the first multimedia communication session.

13. The mobile UE according to claim 12, wherein said transceiver further comprises a short range radio communication unit arranged for supporting communications in a short-range wireless transmission technology for receiving identification data autonomously transmitted by said remote terminal equipment or upon request of said mobile UE.

14. A method of handling media types of an Internet Protocol (IP) multimedia communication session in an IP Multimedia communication Subsystem (IMS) by a calling User Equipment (UE) and a called mobile UE each comprising an IMS client supporting Session Initiation Protocol (SIP) signalling, said IMS comprising an IMS node for supporting a multimedia communications session in said IMS, and at least one remote terminal equipment arranged for exchanging multimedia content via said IMS, said method implemented by the calling UE comprising steps of:
   sending, by said calling UE, a SIP session set up request message to said called mobile UE for establishing a first multimedia communication session in said IMS by said IMS node;
   receiving, by said calling UE, a SIP session accept message from said called mobile UE, wherein said SIP session accept message containing media type handling instructions; and
   initiating, by said calling UE, a second multimedia communication session with one of the at least one remote terminal equipment supported by said IMS node based on said SIP session accept message, wherein at least one media type of said first multimedia communication session is forwarded in said second multimedia communication session to said one of the at least one remote terminal equipment, and wherein the one of the at least one remote terminal equipment plays at least one of audio and video of the at least one media type of the first multimedia communication session.

15. A User Equipment (UE) comprising:
a processor; and
a memory that stores processor-executable instructions where the processor interfaces with the memory and executes the processor-executable instructions to enable following operations:
sending a Session Initiation Protocol (SIP) session set up request message to a called mobile UE for establishing a first multimedia communication session in an IP Multimedia communication Subsystem (IMS);
receiving a SIP session accept message from said called mobile UE, wherein said SIP session accept message containing media type handling instructions; and initiating a second multimedia communication session with a remote terminal equipment supported by said IMS node based on said SIP session accept message, wherein at least one media type of said first multimedia communication session is forwarded in said second multimedia communication session to said remote terminal equipment, and wherein said remote terminal equipment plays at least one of audio and video of the at least one media type of the first multimedia communication session.

16. A method of handling media types of an Internet Protocol (IP) multimedia communication session in an IP Multimedia communication Subsystem (IMS) by a calling User Equipment (UE) and a called mobile UE each comprising an IMS client supporting Session Initiation Protocol (SIP) signalling, said IMS comprising an IMS node for supporting a multimedia communications session in said IMS, and at least one remote terminal equipment arranged for exchanging multimedia content via said IMS, said method implemented by the called mobile UE comprising steps of:

processing, by said called mobile UE, a SIP session set up request message received from the calling UE to establish a first multimedia communications session in said IMS with said calling UE supported by said IMS node;

initiating, by said called mobile UE, a presentation of media type handling options based on said SIP session set up request message;

processing, by the called mobile UE, media type handling instructions based on said media type handling options, and initiating, by the called mobile UE, a transmission of a SIP session accept message to said calling UE in response to said processed SIP session set up request message in accordance with said media type handling instructions, for exchanging at least one media type of said first multimedia communication session so as to be received by one of at least one remote terminal equipment supported by said IMS node based on said SIP session accept message, wherein the one of the at least one remote terminal equipment plays at least one of audio and video of the at least one media type of the first multimedia communication session.

17. The method according to claim 16, further comprising step of receiving, by the called mobile UE, identification data of said at least one remote terminal equipment available to said called mobile UE.

18. The method according to claim 17, wherein said identification data received by said called mobile UE is based on a momentary geographic location of said called mobile UE.

19. A mobile User Equipment (UE) comprising:
a processor; and
a memory that stores processor-executable instructions where the processor interfaces with the memory and executes the processor-executable instructions to enable following operations:
processing a Session Initiation Protocol (SIP) session set up request message received from a calling UE to establish a first multimedia communications session in said IMS with said calling UE supported by said IMS node;
initiating a presentation of media type handling options based on said SIP session set up request message;
processing media type handling instructions based on said media type handling options, and
initiating a transmission of a SIP session accept message to said calling UE in response to said processed SIP session set up request message in accordance with said media type handling instructions, for exchanging at least one media type of said first multimedia communication session so as to be received by one of at least one remote terminal equipment supported by said IMS node based on said SIP session accept message, wherein the one of the at least one remote terminal equipment plays at least one of audio and video of the at least one media type of the first multimedia communication session.

20. The mobile UE according to claim 19, wherein the processor interfaces with the memory and executes the processor-executable instructions to enable following operation: receiving identification data of said at least one remote terminal equipment available to said mobile UE.

21. The mobile UE according to claim 20, wherein said identification data received by said mobile UE is based on a momentary geographic location of said mobile UE.

* * * * *